United States Patent Office 3,119,657
Patented Jan. 28, 1964

3,119,657
PRODUCTION OF HYDROXYLAMINE
HYDROCHLORIDE
David Horvitz and Herbert Leonard, Jr., Cincinnati, Ohio, assignors to National Distillers and Chemical Corporation, New York, N.Y., a corporation of Virginia
No Drawing. Filed Oct. 17, 1961, Ser. No. 145,755
6 Claims. (Cl. 23—87)

This invention relates to a novel process for the preparation of hydroxylamine hydrochloride. More particularly, this invention pertains to the preparation of hydroxylamine hydrochloride from nitric acid by catalytic hydrogenation in the presence of tin chloride and hydrochloric acid.

Methods have been described for the preparation of hydroxylamine from nitric acid by catalytic hydrogenation, which hydrogenation may take place in the presence of certain acids. See, for example, U.S. Patent No. 2,827,362, issued on March 18, 1958. However, hydrochloric acid is specifically excluded in such processes because its presence results in solution of the hydrogenation catalyst under the conditions employed. In order to obtain hydroxylamine hydrochloride by such processes, therefore, it is necessary to convert the hydroxylamine or a salt thereof into the hydroxylamine hydrochloride by a separate step.

One object of this invention is to provide a novel process for the preparation of hydroxylamine hydrochloride from nitric acid by catalytic reduction with hydrogen.

Another object of the invention is to provide a single-step process for the catalytic hydrogenation of nitric acid in the presence of hydrochloric acid so as to obtain hydroxylamine hydrochloride in high conversion yields.

Other objects and advantages of the present invention will become apparent from the ensuing description.

According to the process of this invention, an aqueous solution containing nitric acid, hydrochloric acid and tin chloride is treated with hydrogen in the presence of a hydrogenation catalyst. The yields of hydroxylamine hydrochloride range from about 70% upward.

In carrying out this process the nitric acid concentration may range from 0.1 to 25 parts by weight of nitric acid to 100 parts by weight of water, while hydrogen chloride may range from 1 to 50 parts by weight to 100 parts by weight of water. Although the higher concentrations of nitric acid may be present at the start, highest yields are obtained if nitric acid is added during the course of the reaction. As the reaction proceeds, hydroxylamine hydrochloride and water are formed along with some ammonium chloride. Sufficient hydrochloride acid is present, or added during the reaction, to be in excess of the amount necessary to neutralize the hydroxylamine that has been formed. In a batch operation, nitric acid and hydrochloric acid are added at a rate approximately corresponding to that of the formation of hydroxylamine hydrochloride and ammonium chloride until the desired amount of product has been made, or until the concentrations of materials have passed out of the desired operating range. Excessive amounts of acid are to be avoided in order to prevent catalyst solution. The maximum acid concentrations which can be successfully used varies with the temperature and pressure.

Tin is present as stannous or stannic chloride in a concentration of 0.5 to 60 parts by weight of elemental tin to 100 parts by weight of water.

The hydrogenation catalyst is comprised of platinum or palladium in an active or finely divided form, unsupported or supported on any conventional material, such as carbon, alumina or silica. The quantity employed is not critical. It may vary from about 0.05 to 3.0 parts by weight of active catalyst per 100 parts of tin. It is preferred to use about 5% platinum or palladium on active carbon, the percentage figure referring to the percent of total catalyst and carrier weight which is represented by the active catalyst metal, but other concentrations of catalysts may be employed. The catalysts and associated carriers are preferably used in the reaction mixture in powdered form, although they may also be used in any other form, such as granular, which may present an active surface.

The reaction rate varies with temperature, higher temperatures increasing the rate of reaction. However, if the temperature of the reaction mixture is too high, the yield of hydroxylamine may decrease.

The preferred range of temperature is from 0° C. to about 40° C. The upper limit above which the temperature of the mixture should not be permitted to rise any time during the reaction is about 90° C.

The reaction rate varies with pressure, the rate being increased as the pressure under which the reaction is carried out is increased. A competing reaction is the further reduction of the hydroxylamine to ammonia. Increased pressure increases the rate of formation of hydroxylamine more than it does its subsequent reduction to ammonia; consequently, higher pressures are more desirable. The process is operable with the hydrogen pressure from atmospheric up to about 3000 p.s.i.g. or higher.

Since the catalyst used may be reactive with certain concentrations of acid, maintenance of the ranges of concentrations of acids as prescribed is important.

The following preferred conditions indicate the areas of optimum yield: (1) nitric acid in the range of 0.1 to 10 parts by weight of nitric acid to 100 parts by weight of water; (2) hydrochloric acid in the range of 20 to 50 parts by weight of hydrogen chloride to 100 parts by weight of water; (3) tin chloride in the range of 1 to 20 parts by weight of elemental tin to 100 parts by weight of water; (4) a temperature in the range of 0 to 40° C.; and (5) a pressure in the range of 30 to 1000 p.s.i.g. (pounds per square inch, gauge pressure).

The product, hydroxylamine hydrochloride, may be isolated from the reaction mixture by any conventional means. For example, the aqueous solution may be extracted with ether, or other suitable organic solvent, which removes the tin salts, and the hydroxylamine hydrochloride may then be recovered by evaporation of the aqueous solution and recrystallization, if necessary. Another procedure is to add an alcohol, such as n-propanol, and anhydrous hydrogen chloride which will precipitate the hydroxylamine hydrochloride and leave the tin salts in solution. It may be desirable to reduce the water volume by evaporation or distillation before treatment with the alcohol and hydrogen chloride.

In a continuous process the nitric acid and hydrochloric acid are added continuously during the reaction and a stream of product is also withdrawn continuously. This stream is treated in a manner so as to remove a substantial portion of the hydroxylamine hydrochloride, ammonium chloride and water while returning the tin salts and excess hydrochloric acid (and nitric acid, if present) to the reactor. This operation is conducted in such a manner that a steady state of the material concentration is achieved in the reactor, these concentrations being held within the preferred operating range. The hydroxylamine hydrochloride may be isolated from the stream issuing from the reactor as described above for the batch process.

The following example illustrates a method of carrying out the present invention, but it is to be understood that the example is given for purposes of illustration and not of limitation.

Example

Concentrated nitric acid (9.0 g.) was added slowly to a cooled and stirred solution of stannous chloride dihydrate (17.0 g.) in 58.5 ml. of concentrated hydrochloric acid and 25 mls. of water. The reaction temperature did not exceed 40° C. at any time. Stirring was continued for 15 minutes longer following the addition of the nitric acid. An analysis at this time showed the presence of 25.15 millimoles of hydroxylamine hydrochloride in solution. Practically all of the tin was in the form of stannic chloride, since an analysis for stannous tin showed the presence of only 0.47 millimole. To this solution was now added 0.477 g. of a 5% platinum-on-carbon catalyst. The solution was placed in a pressure bottle; hydrogen gas was introduced at a pressure of 46 p.s.i.g. and the bottle was shaken. Samples were withdrawn from time to time. The following table shows the progress of the reaction:

| Time in minutes | Millimoles Hydroxylamine Formed during Interval Shown | Percent Yield of Hydroxylamine Based on Nitric Acid Consumed During Interval Shown |
| --- | --- | --- |
| 300 | 10.71 | 78.9 |
| 420 | 10.50 | 72.2 |
| 420 | 9.47 | 77.1 |
| 405 | 6.97 | 80.8 |

The over-all yield of hydroxylamine produced by the hydrogenation of the nitric acid, based on the nitric acid consumed, was 77.3%.

While particular embodiments of this invention are shown above, it will be understood that the invention is obviously subject to variations and modifications without departing from its broader aspects.

What is claimed is:

1. A process for producing hydroxylamine hydrochloride which comprises treating an aqueous reaction mixture containing nitric acid in the range of 0.1 to 25 parts by weight of nitric acid to 100 parts by weight of water, hydrochloric acid in the range of 1 to 50 parts by weight of hydrochloric acid to 100 parts by weight of water, tin chloride in a range of 0.5 to 60 parts by weight of elemental tin to 100 parts by weight of water, and an active hydrogenation catalyst selected from the group consisting of platinum and palladium with hydrogen at a temperature from above the freezing point of the reaction mixture to about 90° C., and at a pressure from atmospheric to about 3000 p.s.i.g., and recovering the hydroxylamine hydrochloride so produced.

2. The process of claim 1 wherein said temperature is within the range of about 0° C. to 40° C.

3. The process of claim 1 wherein said hydrogen is supplied at a pressure of 30 to 1000 p.s.i.g. with continuous agitation.

4. The process of claim 1 wherein said active hydrogenation catalyst is an active platinum catalyst supported on an inert carrier.

5. A process for producing hydroxylamine hydrochloride which comprises treating an aqueous reaction mixture containing nitric acid in the range of 0.1 to 10 parts by weight of nitric acid to 100 parts by weight of water, hydrochloric acid in the range of 20 to 50 parts by weight of hydrochloric acid to 100 parts by weight of water, tin chloride in the range of 1 to 20 parts by weight of elemental tin to 100 parts by weight of water, and an active platinum catalyst on a carbon carrier, with hydrogen at a temperature in the range of 0° C. to 40° C., and at a pressure in the range of 30 to 1000 p.s.i.g., and recovering the hydroxylamine hydrochloride produced.

6. The process of claim 5 wherein nitric acid and hydrochloric acid are continuously added to said reaction mixture, and a stream of product is continuously withdrawn from the reaction mixture during said treating process, said hydroxylamine hydrochloride, together with by-product ammonium chloride and water being separated from said stream of product, and said hydrochloric acid, nitric acid and tin chloride components from said stream of product being returned to said reaction mixture, said concentrations of nitric acid, hydrochloric acid, and tin chloride being maintained within said operating ranges throughout the reaction.

References Cited in the file of this patent

UNITED STATES PATENTS

| 2,827,362 | Bull et al. | Mar. 18, 1958 |
| 2,950,954 | Mador et al. | Aug. 30, 1960 |

FOREIGN PATENTS

| 521,048 | Canada | Mar. 25, 1952 |

OTHER REFERENCES

Mellor: Comprehensive Treatise on Inorganic and Theoretical Chemistry, vol. 8, pages 280–1, 300–1 (1928). Longmans, Green and Company, New York.